Patented May 14, 1929.

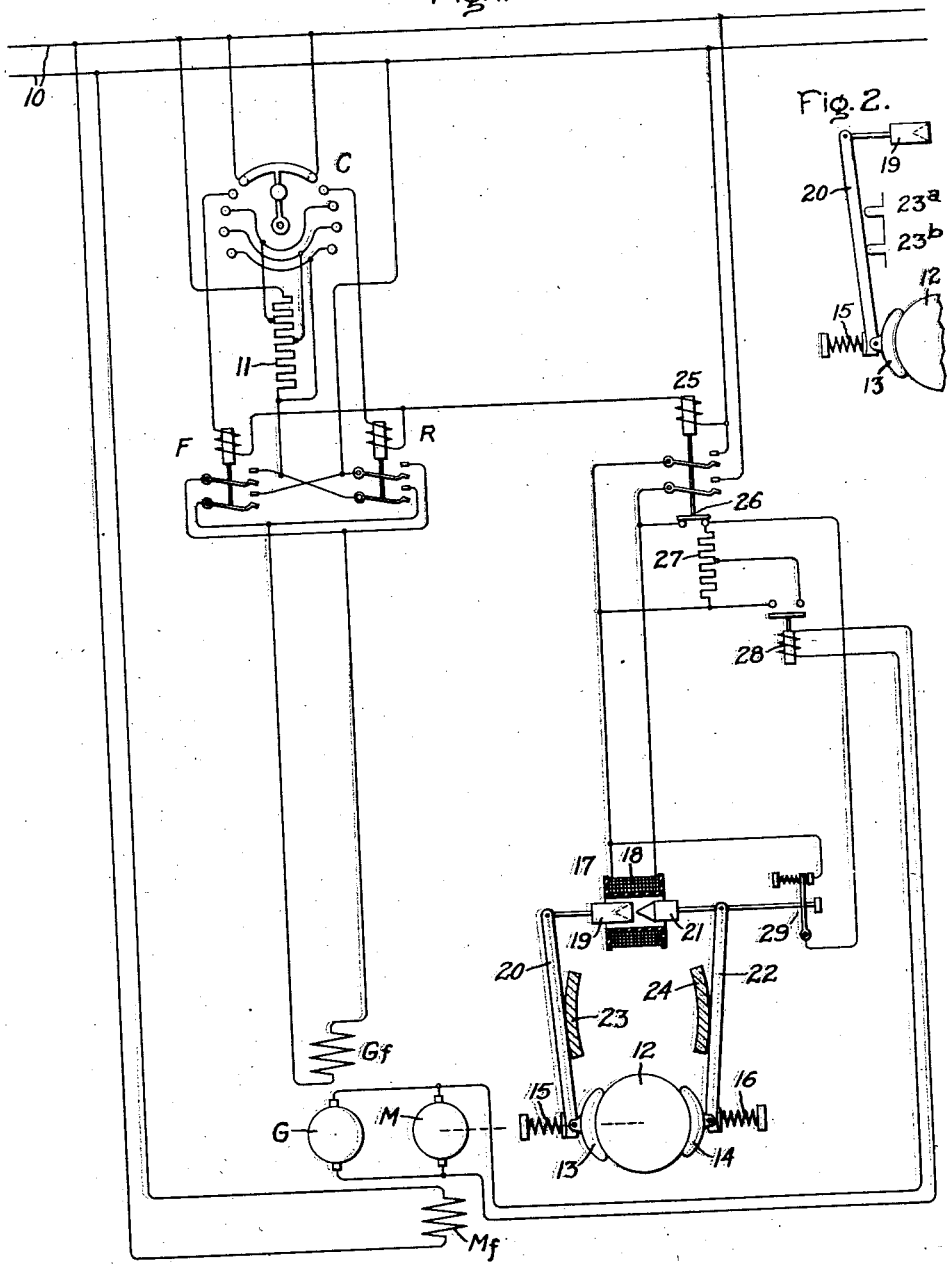

1,713,228

UNITED STATES PATENT OFFICE.

ELLIOTT D. HARRINGTON, OF SCHENECTADY, NEW YORK, ASSIGNOR TO GENERAL ELECTRIC COMPANY, A CORPORATION OF NEW YORK.

CONTROL OF BRAKING EFFECT.

Application filed August 31, 1927. Serial No. 216,680.

My invention relates to improvements in the regulation of the braking effect of mechanical brakes.

The invention has a particular application in the regulation of the braking effect applied to motor driven or regulated apparatus, such as electric hoists, electric elevators, and the like.

In an electric elevator, for example, the elevator is ordinarily stopped and held in any desired position by a mechanical friction brake. The ordinary arrangement is one in which electromagnetic means is connected to the brake shoes so as to release the shoes against the action of a spring or a plurality of springs which effect the setting of the shoes on the brake wheel. Unless special provision is made therefor, the ordinary equipments leave something to be desired in that the setting of the brake is either too sudden or unduly prolonged. In other words, the brake mechanism must be so organized as to produce a smooth brake application under the ordinary conditions encountered, and there must not be a final jerk when the brake sets fully. An unpleasant sensation is experienced by one riding an elevator when the brake sets too quickly and a grabbing effect is had. Likewise, an unpleasant sensation is experienced when the brake "slides" unduly.

The principal object of the invention is to produce a refinement in the control of the setting of the brake such that the driven device is stopped smoothly under the ordinary conditions encountered.

In carrying the invention into effect in the form which I now regard as the preferred form thereof, I provide a connection between the brake releasing means and the brake shoes such that the ratio of movement of the releasing means and the brake shoes varies as the shoes move with reference to the brake wheel. This variable ratio is designed to be such that the mechanical advantage of the releasing means over the setting means is increased while the brake shoes are moving toward the fully set position. In order to insure that the setting of the brake shall be a function of an operating condition of the driven device, I control the current in the brake winding in response to such condition, as for example, in response to the speed of the driven device. A further refinement is had in that the current in the brake winding circuit is regulated in accordance with the extent to which the brake shoes have moved to the applied position. A still further refinement is that the cooperating magnetic members of the releasing solenoid shall have tapering interfitting surfaces so as to obtain a desired tapering off of the pull of the solenoid.

For a better understanding of the invention, reference is had to the accompanying drawing, in which Fig. 1 shows a system of electric motor control incorporating the invention, and Fig. 2 shows a detail of a modification of the said system.

Referring to the drawing, Fig. 1, it will be observed that I have disclosed the invention in a system of motor control for an electric motor, in which an electric drive of the Leonard type is employed. Thus, the Leonard drive comprises the generator G having a separately excited field $Gf$ and a motor M having its armature included in a local circuit with the armature of the generator and its field $Mf$ separately excited from the source of supply 10. As is customary in Leonard drives, the speed and direction of operation of the motor is controlled by controlling the direction of current through the generator field winding and the value of that current. Thus, a controller is provided for the generator excited field and this controller includes the master switch or master controller C which governs the reversing contactors F and R. When the controller C is operated so as to energize the contactor F to close its main contacts, the generator field winding is connected to the source 10 in such manner that forward direction of operation of the motor is effected, and when the controller is operated so as to close the contactor R, the motor is caused to run in the opposite direction. The controller C not only governs the reversing contactors F and R but also governs the resistor 11 in the circuit of the generator field winding $Gf$. The arrangement so far described is the customary Leonard type of drive, the construction and arrangement of which and the operation thereof are well understood by those skilled in the art.

The improvements of my present invention are directed to the braking effect which is had for bringing the motor and its driven load to rest in a smooth and nicely regulated manner. For purposes of explanation, I will describe the invention in connection with an electric elevator in which the previously referred to Leonard drive is provided for effecting the hoisting and lowering of the elevator car. Connected with a rotating element of the motor M is a friction brake including the cooperating friction elements comprising the brake wheel 12 and the brake shoes 13 and 14, which cooperate therewith. These brake shoes are normally in their fully applied position by reason of the fact that the shoes are normally urged into the fully set position by means of the springs 15 and 16, respectively. The brake shoes are released from the brake wheel 12 by the electromagnetic releasing means 17. This releasing means comprises a brake winding 18 and a movable member 19 which is connected to the brake shoe 13 through the lever 20 and a cooperating movable magnetic member 21, which is connected through the lever 22 with the brake shoe 14.

A variable fulcrum is provided for each of the levers 20 and 22. Thus the lever 20 is provided with the fulcrum 23, and the lever 22 is provided with the fulcrum 24. The fulcrums 23 and 24 are each provided with a curved engaging surface for the associated lever, and the curvature of this surface is such that the mechanical advantage of the electromagnetic releasing means over the brake setting spring will vary as the associated brake shoe moves into and out of the fully set position with relation to the brake wheel. The object of this arrangement may be briefly stated as follows:

When the cooperating movable members 19 and 21 of the releasing electromagnet are in their fully attracted position, the releasing electromagnet will be able to exert its greatest effect on these members in effecting the releasing of the brake shoes from the brake wheel against the action of the setting springs. As these magnetic members move away from each other by reason of a decrease in the energization of the winding of the releasing electromagnet, the leverage through which the magnetic members 19 and 21 act will automatically increase. Thus, the ratio of the leverages through which the releasing electromagnet and the setting spring act will vary so as to take into account the variation of the pull of the releasing electromagnet as the movable magnetic members of the releasing electromagnet move into and out of the attracted position with reference to each other. This is of advantage, since by increasing the leverage through which the releasing electromagnet acts as the brake shoes are moving to the fully set position, the releasing electromagnet will maintain a dominance over the setting of the brake throughout the entire period of the setting of the brake shoes with reference to the brake wheel, instead of as in some arrangement with which I am familiar in which when the magnetic movable element or elements of the brake releasing electromagnet move toward their unattracted position with reference to each other, the effect of the setting spring increasingly predominates so that finally when the brake sets a grabbing effect or a jerk in the operation of the driven device is experienced.

The brake winding 18 is connectible to the source of supply 10 through the contactor 25. This contactor is provided with an auxiliary switch 26 which, when the contactor opens, automatically connects the brake winding 18 in a local discharge circuit which includes the resistor 27. The value of the current in this local discharge circuit is regulated in accordance with an operating condition of the driven device by means of the electromagnetic switch 28. Thus, when the brake winding is disconnected from the source at a time in which the motor M is running at substantially full speed or a speed higher than a predetermined value, the switch 28 will be caused to automatically close its contacts and shunt a portion of the resistor 27. This will effect a reduction in the resistance of the local discharge circuit in which the brake winding 18 is included and effect a delayed action in the setting of the brake. As a convenient means of regulating the automatic action of the switch 28 so as to be in accordance with an operating condition of the driven device, I connect the winding of this switch so as to be energized in accordance with the potential at the armature terminals of the motor M. The energization of the winding of the switch 28 will thus be substantially in accordance with the speed of the driven device.

In order to effect a further refinement in the setting of the brake, I provide a contact 29, which is connected to the magnetic movable member 21 of the releasing electromagnet so as to be automatically closed in accordance with the bias thereof when the brake shoes have closely approached their fully set position with reference to the brake wheel 12. When the contact 29 closes it establishes a local discharge circuit for the brake winding 18 and in effect shunts the entire resistor 27. This low resistance discharge circuit will effect temporarily a delay in the releasing action of the brake and provide a cushioning effect for the brake shoes as they come into engagement with the brake wheel. In other words, the braking torque will be caused to build up gradually instead of being applied suddenly.

I have introduced a further refinement in the control of the setting of the brake by the shape which I have given the cooperating surfaces of the magnetic movable members 19 and 21 of the releasing electromagnet. It will be seen that the member 21 has a conical shaped end which fits into and nests with the end of the cooperating member 19. This has an advantage in that a tapering off effect is had as the members 19 and 21 separate, the magnetic pull between these two members remaining at a substantially higher value for a longer period than if the members were provided with flat engaging surfaces.

As thus constructed and arranged and with the parts in their respective positions shown in the drawings, the operation of the system is as follows:

In order to cause operation of the driven device (not shown, and assumed to be an electric elevator), the controller C will be turned either clockwise or counterclockwise to its first operative position. Let it be assumed that a hoisting of the driven load is desired. The controller C will then be thrown counterclockwise to its first position, thereby effecting the energization and the closing of the directional contactor F and the connection of the generator field winding Gf to the separate source of supply 10 with all of the regulating resistor 11 included in the circuit. The contactor 25 will be energized simultaneously with the energization of the contactor F. The closing of the contactor 25 will connect the winding 18 of the brake magnet to the source 10 and effect a prompt release of the brake shoes from the brake wheel 12. It will be observed that the auxiliary switch 26 associated with contactor 25 will open the circuit through its contacts and open the discharge circuit for the brake magnet winding. When the brake shoes have separated slightly from the brake wheel, the switch 29 will be automatically opened.

If the driven device, the elevator, is run at the low speed corresponding to the initial position of the master controller C and the master controller returned to its off position, as indicated in the drawing, the electromagnetic switch 28 will not have received sufficient energization to close its contacts, so that upon the opening of the directional contactor F and the opening of the contactor 25, the brake winding 18 will be included in a local circuit with the entire resistor 27. This will effect a comparatively rapid setting of the brake because of the fact that the persisting current in the brake winding will be of comparatively small value. As the magnetic members 19 and 21 separate, the ratio of the leverage between the releasing magnet and the setting springs 15 and 16 will become more favorable for the releasing electromagnet so that although the pull of the releasing electromagnet decreases as members 19 and 21 separate, this decreasing pull is compensated for somewhat by the increasing ratio of the leverage through which the releasing electromagnet operates. When the brake shoes have practically moved to their fully applied positions, the switch 29 will close and establish for the brake winding a discharge circuit of very low resistance. This will delay the reduction in the current in the brake winding circuit and provide a cushioning action as the brake shoes come into engagement with the brake wheel. This is desirable since the braking torque is caused to build up smoothly and gradually, and the final jerk when the brake shoes come into full engagement with the brake wheel is eliminated.

In case the master controller C had been advanced through its operative positions so as to short-circuit successively the sections of the regulating resistor 11, the motor M will be caused to operate at its full running speed. In this case, the winding of the switch 28 will be sufficiently energized to cause this switch to close and shunt a portion of the resistor 27. Under these conditions when the master switch C is returned to its off position, the directional contactor F and the brake winding contactor 25 will be caused to open as before, but the resistance of the local circuit in which the brake winding is included by the closing of the auxiliary switch 26 is materially less than was the case previously in which the driven device is stopped from operating at a comparatively low speed. This is desirable since a longer delay in the final setting of the brake should be had when the driven device is being brought to rest from a high speed than when the device is being brought to rest from a comparatively low speed. The operation of the equipment is otherwise the same as was previously the case, except that when the speed of the driven device drops to such a value that the electromagnetic switch 28 is not sufficiently energized to maintain its contacts in the closed position this switch will open and temporarily increase the resistance of the local circuit in which the brake winding is included. This feature is of no particular moment since at about this time the switch 29 will close and connect the brake winding 18 in a local circuit of very low resistance.

While certain of the features of my invention, as for example the variation in the ratio of the movement of the brake shoes and the releasing means as the brake shoes are moved with reference to the brake wheel, the interfitting surfaces of the magnetic movable members 19 and 21, the control of the resistance of the brake winding discharge circuit in accordance with the speed of the driven device, and the control of the resistance of this circuit in accordance with the extent of the setting of the brake shoes are individually desirable features, the combined function produced by the operation of the respective features produces a nicety in the control of the setting of the mechanical brake which is especially desirable.

It is not necessary that the variable fulcrum for the levers 20 and 22 be curved members as shown in Fig. 1, since for some applications an arrangement such as shown in Fig. 2 may be used. For example, the variability of the fulcrum may be formed by having a plurality of fulcrums, as the fulcrums 23ª and 23ᵇ of Fig. 2, the lever 20 shifting from one fulcrum to the other as the shoe 13 moves with reference to the brake wheel 12.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination in a friction brake, cooperating friction elements for producing a braking effect, means for effecting relative movement of said elements to effect release of the braking effect, and means cooperating with said releasing means and a portion of said elements by which the ratio of movement of said portion with respect to said releasing means is varied as said portion is moved with reference to the remainder of said elements.

2. In combination in a friction brake, cooperating friction elements for producing a braking effect, a releasing means, a lever connecting a portion of said elements and said releasing means, and a variable fulcrum for said lever for causing the ratio of movement of said portion and said releasing means to vary as said portion moves with reference to the remainder of the elements.

3. In combination in a friction brake, cooperating friction elements for producing a braking effect, setting means for said elements, releasing means for said elements, and means whereby the mechanical advantage of the releasing means over said setting means is greatest in the fully set position of said elements and is least in the fully released position thereof.

4. In combination in a friction brake, a brake wheel, a friction element cooperating therewith, means for normally applying said friction element to said wheel, electromagnetic means for releasing said element from said wheel, and means cooperating with said releasing means and said shoe by which the ratio of movement of said element with respect to said releasing means is varied as the element is moved with reference to the wheel.

5. In combination in a friction brake, a brake wheel and a normally applied friction element cooperating therewith, means for releasing said element from said wheel, a lever connecting said releasing means and said shoe, and means for varying inversely the respective arms of said lever as the element moves with reference to said wheel.

6. In combination in a friction brake, a brake wheel, brake shoes cooperating therewith, means for normally applying said shoes to said wheel, an electromagnetic releasing device for said shoes, connections between said device and said shoes, and means for causing the ratio of movement of said device and said shoes to vary as the shoes move with reference to said wheel.

7. In combination in a friction brake, a brake wheel and normally applied brake shoes cooperating therewith, electromagnetic releasing means, a lever connecting each of said shoes with said releasing means, and a variable fulcrum for each of said levers for causing the ratio of movement of said shoes and said releasing means to vary as the shoes move with reference to said wheel.

8. In combination, a driving motor, a normally applied mechanical brake having a winding arranged to be connected to a source of supply and movable magnetic means under the control of said winding for releasing the brake, connections through which said means exerts a variable releasing effect depending on the extent of the movement of said means, and means for automatically controlling the current in said winding in dependence on an operating condition of the motor and the extent of movement of said magnetic means.

9. In combination, a driving motor, a normally applied mechanical brake having a winding arranged to be connected to a source of supply and movable magnetic means under the control of said winding for releasing the brake, connections through which said means exerts a variable releasing effect depending on the extent of the movement of said means, a discharge circuit for said winding, and means for automatically controlling the resistance of said discharge circuit jointly in response to substantially the speed of the motor and the extent of the movement of said magnetic means.

10. In combination, a driving motor, a friction brake therefor, the said brake comprising a brake wheel connected to said motor and a normally applied brake shoe cooperating therewith, electromagnetic releasing means for said shoe, means connecting said releasing means with said shoe through which the ratio of movement of the shoe with respect to the releasing means is varied as the shoe is moved with reference to said wheel, switch mechanism for connecting the winding of said releasing means to a source of supply to effect the release of said shoe; a local discharge circuit for said winding controlled by said switch, and means for automatically controlling the resistance of said discharge circuit in response to substantially the speed of said motor and the degree to which said shoe has moved to its applied position.

In witness whereof, I have hereunto set my hand this 29th day of August, 1927.

ELLIOTT G. HARRINGTON.